Patented June 26, 1945

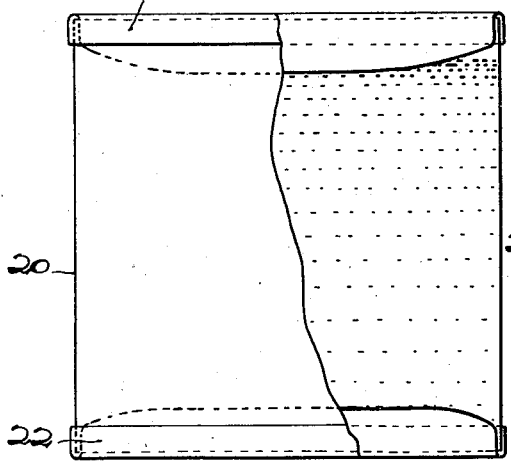
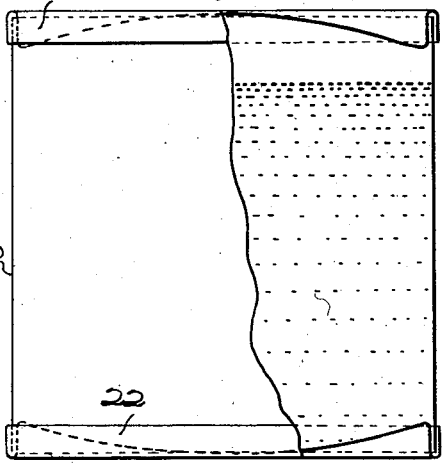
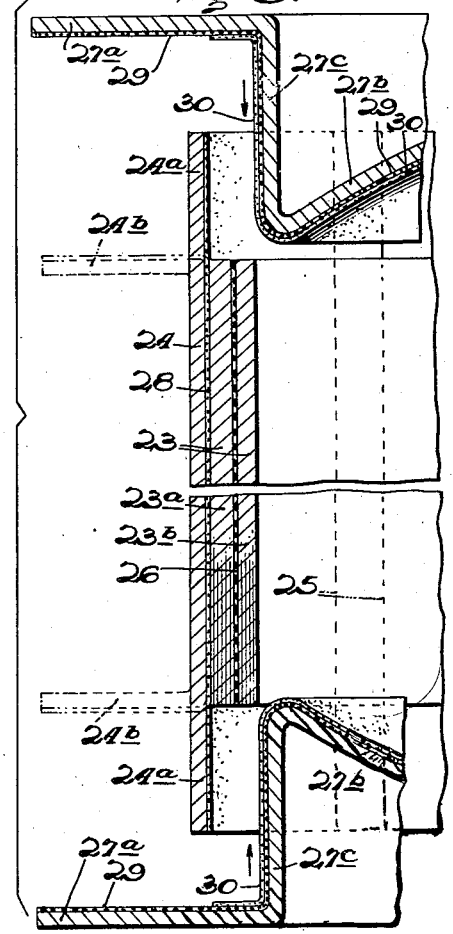
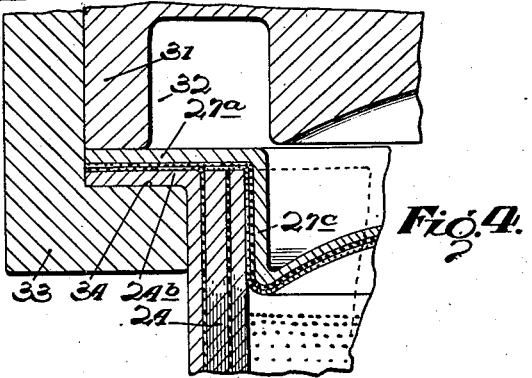
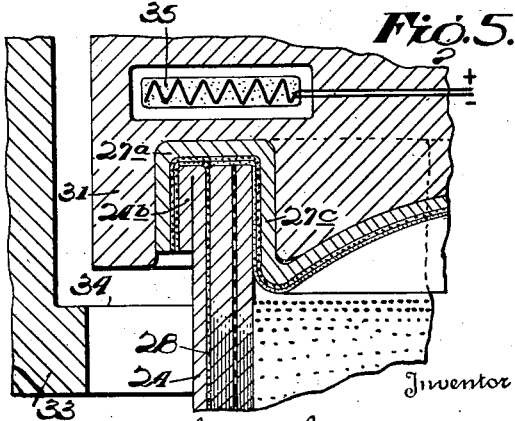
Inventor
Arthur F. Stagmeier
By Cameron, Kerkam + Sutton
Attorney

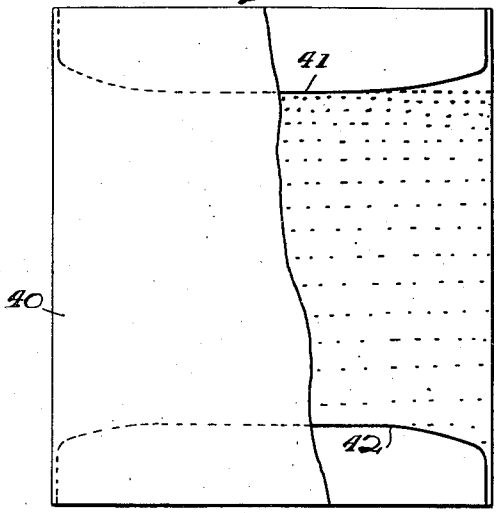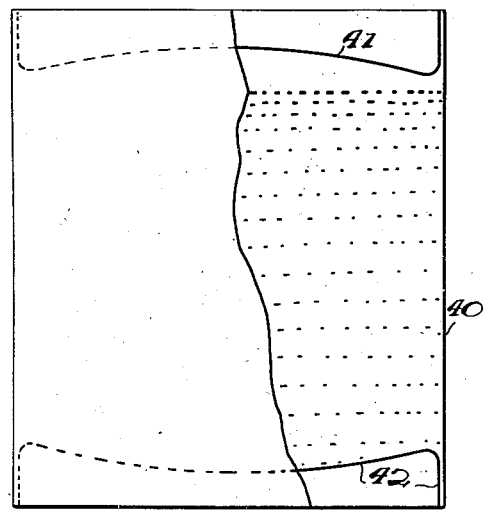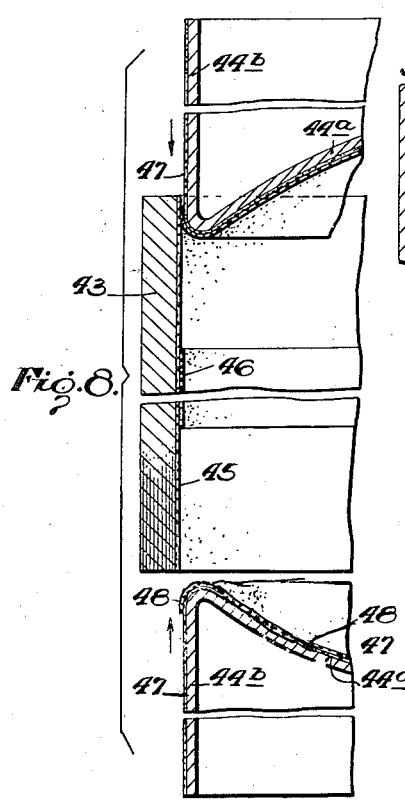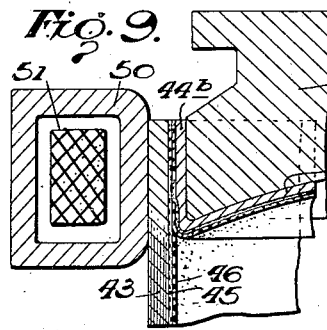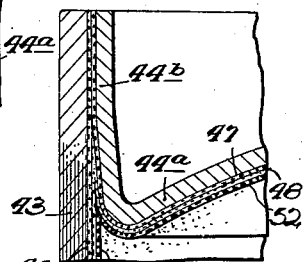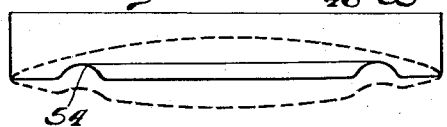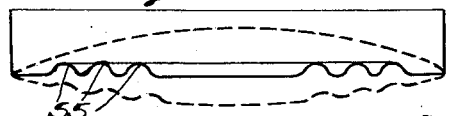

2,379,043

UNITED STATES PATENT OFFICE 2,379,043

CONTAINER

Arthur F. Stagmeier, Upper Montclair, N. J., assignor to General Foods Corporation, New York, N. Y., a corporation of Delaware Application December 21, 1942, Serial No. 469,683

4 Claims. (Cl. 229—3.1)

This invention relates to containers suitable for the vacuum packaging of granular materials, and especially those granular materials which evolve gases, such as roasted coffee which will be referred to hereinafter by way of example. It will be understood, however, that the invention is applicable to the vacuum packing of any desired granular material, whether it evolves gas or not.

Heretofore roasted coffee has been vacuum packed in strong rigid containers made of materials such as metal or glass. From the standpoint of economy, it is desirable to employ containers of fibrous material such as cardboard, heavy paper or the like, which have been rendered impervious to air, but if such containers are truly impervious, the external atmospheric pressure on vacuumization and subsequently the internal pressure of the gas evolved by the roasted coffee are difficult to handle without rupture of the relatively weak container walls.

A certain amount of free space or head room must be left within the container to avoid spilling during packing and accidental infiltration of coffee grains between the lid and container proper, as well as to compensate for variations in volume per unit weight resulting from different grinds or from roasting under different conditions of time and temperature. Hence when the container is vacuumized, its walls tend to crumple under atmospheric pressure, and if not broken open, are likely to have their shape so altered as to make them totally unsuitable for sale. Moreover, crumpling tends to weaken the container walls at the seams and fold lines so that the pressure of the gas subsequently evolved ruptures or bursts the container and the vacuum is destroyed. If this result does not follow, on the other hand, the container may expand into an irregular bulged shape such that it not only is unsightly and unfit for sale, but also cannot be properly packed for shipment.

The general object of the present invention is to provide a construction for containers of fibrous material which will successfully adapt them to the vacuum packaging of granular materials.

Another object is to provide a container of fibrous material for the above purposes which is shaped generally to resist deformation but in which capacity for inward or outward deformation is purposely provided at points such that the deleterious effects referred to above do not occur.

A further object is to provide a container of the type characterized above wherein deformation takes place within the limits of a desired external container size and shape and hence without impairing the appearance of the container or interfering with its stacking or packing for shipment.

To these ends I provide a container of fibrous material, such as cardboard rendered impervious to air in any suitable way, which comprises a main cylindrical or substantially cylindrical wall and circular or disc-like end closures, one or both of the latter being normally bulged, dished, or otherwise formed so as to be capable of deformation inwardly under atmospheric pressure and subsequent deformation outwardly under gas pressure. Also the end closures are preferably housed within the ends of the main cylindrical wall so that inward deformation is concealed, while if outward deformation takes place, the closures are not bulged substantially beyond the ends of the cylinder. Thus an overall external cylindrical shape is mantained at all times.

In such a container, the pressure either outwardly or inwardly on the cylindrical main wall is uniform at all points, there are no fold lines or bends to weaken this wall, and its shape is such as to resist substantial pressures without crumpling or bursting, especially in view of the co-operating yieldable end closures. When the container is vacuumized, the closures yield inwardly into substantial contact with the granular mass, so that the container walls are supported by a substantially solid body of granular material and crumpling effects which might otherwise be produced by atmospheric pressure, hard usage, etc., are effectively resisted. In the case of materials which do not evolve gas, this condition is maintained until the container is opened for use. When gas is evolved, on the other hand, the closures begin to deform outwardly from the position described above as soon as the pressure within the container exceeds atmospheric pressure. An increase of container volume results, with a corresponding reduction of pressure due to evolved gas, and although the closures may attain positions of maximum outward deformation, the internal pressure is reduced sufficiently to enable the container to resist rupture.

As stated above the container may be provided with only one deformable closure, which may be either the top or bottom closure and may be designed to produce the same results as two deformable closures. To this end it should be capable of sufficient inward deformation to compact and hold the granular material, and sufficient outward deformation to limit the pressure built up within the container to the proper value. Under these conditions no substantial deformation of the other closure takes place. The deformable closures, whether one or two, are also preferably sealed to the inner side of the main cylindrical wall at sufficient distances within the ends of the cylinders so that they do not bulge substantially beyond the ends even in the condition of maximum outward deformation.

Such containers of fibrous material may be made impervious to air and gas by providing their side walls and closures with a continuous film or coating of a gas-impermeable material. For this purpose I prefer to use a heat sealable material, such as polyvinyl alcohol, so that the seams can be sealed after vacuumizing by the application of pressure and heat, although I may use a film of non-sealable material and form the seals by any other appropriate means. The gas-impervious coating may be applied in any suitable manner, as by painting, spraying, laminating, etc. Furthermore, certain materials such as polyvinyl alcohol tend to lose moisture gradually to granular materials which are hygroscopic in nature, such as coffee, and to become brittle in time so that the coating may crack or rupture. Hence in such cases I preferably separate the coating from the granular material by an interposed layer or sheet of any suitable moisture-impermeable material which, like the polyvinyl alcohol coating, may be applied in any suitable manner. Examples of moisture impermeable materials which may be used are asphaltum, products known by the trade names of "Pliolite" and "Pliofilm," glassine, wax, paraffin, lacquer, etc. It may also be desirable with materials such as polyvinyl alcohol to lacquer the outside of the container or to provide an outer film or coating of moisture-impermeable material in any other suitable way.

Two embodiments of the invention have been illustrated in the accompanying drawings, but it is to be expressly understood that the drawings are for purposes of illustration only and are not to be taken as a definition of the limits of the invention, reference being had to the appended claims for this purpose.

In the drawings,

Fig. 1 illustrates a container embodying the invention, being partly in section to show the closures in their inward positions.

Fig. 2 is a similar view showing the closures in outward positions;

Fig. 3 is an enlarged sectional view of the side wall and end closures before assembly;

Figs. 4 and 5 are detail views illustrating sealing and crimping operations, respectively;

Fig. 6 is a view of another container embodying the invention, being partly in section to show the closures in inward positions;

Fig. 7 is a view similar to Fig. 6 showing the closures in outward positions;

Fig. 8 is an enlarged sectional view of the side wall and end closures before assembly;

Fig. 9 is a detail view illustrating the sealing operation;

Fig. 10 is an enlarged sectional view illustrating a modified form of container; and Figs. 11 and 12 are diagrammatic views of modified forms of closures.

Referring now to Figs. 1 to 3, the container comprises a cylindrical side wall generally indicated by the numeral 20, and upper and lower closures indicated generally by the numerals 21 and 22, respectively. As seen in Fig. 3, the side wall 20 may suitably comprise two elements of fibrous material, such as an inner cardboard cylinder 23 of spirally wound cardboard and an outer paper or cardboard sleeve 24 which may conveniently be wrapped around the inner cylinder 23 with its overlapping ends joined at 25. The inner cylinder may be, for example, a cardboard tube of standard construction about 0.04 inch thick and comprising two reversely wound portions 23a and 23b separated by a layer 26 of asphaltum, while the sleeve 24 is of relatively thin material, such as fifteen point board, which is about 0.012 of an inch thick. Sleeve 24 is longer than the inner cylinder 23 and its ends 24a may be bent or flanged outwardly to the dotted line position 24b.

The closures 21 and 22 may each suitably comprise a single sheet of fibrous material which is of about the same thickness as the sleeve 24 and is shaped to include a peripheral flange 27a adapted to fit upon the flanges 24b, a central portion 27b which as shown is normally bulged outwardly, and an intermediate cylindrical portion 27c adapted to project into the inner cylinder 23 far enough that the bulged portion 27b does not extend beyond the end of the cylinder.

The entire inner surface of the sleeve 24, including the extensions 24a, is covered with a coating 28 of polyvinyl alcohol. Similarly the entire inner surfaces of the closure elements are covered with coatings 29 of polyvinyl alcohol, but additional coatings 30 of "Pliolite" or the like are applied over the coatings 29 on the bulged portions 27b and cylindrical portions 27c, leaving the coatings 29 exposed only on the flanges 27a. Thus when the closures are fitted on the cylinder, the two polyvinyl alcohol coatings 28 and 29 of the flanges 24b and 27a contact one another and can be sealed together, while the coatings 30 and the asphaltum layer 26 provide a moisture-impermeable envelope between the polyvinyl alcohol and the enclosed granular material. To insure a complete envelope, the coatings 30 preferably extend somewhat beyond the asphaltum layer 26, and if they are of heat-sealable material, they may cover the coatings 29 completely and be sealed directly to the coating 28. After sealing, the sealed flanges 24b and 27a are preferably crimped or bent downwardly against the side wall 20 to finish and further strengthen the container.

Any suitable procedure may be used in assembling, packing, vacuumizing, and sealing these containers. For example, the sleeve extensions 24a are forced outwardly to form the flanges 24b, and the bottom closure 22 is then fitted on the container and the contacting flanges 24b and 27a sealed together and crimped against the side wall 20. The container is then filled to the desired depth with granular material, the upper closure 21 is put loosely in place, and the whole placed in a vacuum chamber wherein the same sealing and crimping operations are performed on the upper closure 21. The vacuum is then released and the sealed container removed from the vacuum chamber.

These sealing and crimping operations are illustrated by Figs. 4 and 5. The co-operating flanges 24b and 27a are gripped between an upper sealing member 31 having a slot 32 and a lower sealing member 33 having a shoulder 34 which provides a seating surface for the flange 24b. The sealing member 31, heated to the desired temperature in any suitable way as by the electric heating element 35, is brought into contact with the closure flange 27a, as shown in Fig. 4, with sufficient pressure to seal the latter to the flange 24b. When the proper sealing time has elapsed, the sealing member 33 is moved away, and relative vertical movement between the container and the sealing member 31 forces the sealed flanges 24b and 27a into the slot 32 and crimps them against the side wall 20, as shown in Fig. 5. It will be understood that a similar apparatus and procedure may first be used to seal and crimp the lower closure 22, although in this instance there is no need of maintaining vacuum in the container.

Fig. 1 illustrates the container immediately following vacuumization with the closures 21 and 22 both in positions of inward deformation, the lower closure 22 being somewhat less deformed due to the weight of the granular material. It will be noted that free space may still be present in the upper corners of the container, but nevertheless the mass of granular material as a whole is packed tightly and supports the container against external pressure. In the case of granular material evolving gas, each of the closures 21 and 22 may eventually reach a position of maximum outward deformation, as shown in Fig. 2, reducing the pressure built up within the container and forming a container which resists rupture much in the same manner as a pressure tank. In either position of the closures, however, the container remains a true cylinder from the standpoints of general outward appearance and of stacking or packing for shipment.

Figs. 6 to 8 illustrate another type of container embodying the invention and comprising a cylindrical side wall generally indicated by the numeral 40 and upper and lower closures generally indicated by the numerals 41 and 42, respectively. Referring to Fig. 8, the side wall 40 of this embodiment comprises a single cylinder 43 of relatively heavy cardboard or other fibrous material, while each of the closures 41 and 42 comprises a circular element of relatively light fibrous material formed to include a central portion 44a which normally bulges outwardly and a peripheral cylindrical portion 44b adapted to extend into the cylinder 43. The inner surface of the cylinder 43 is provided with a polyvinyl alcohol coating 45 covered with a "Pliolite" coating 46 which terminates short of the ends of the cylinder, while the inner surface of each of the closure elements 44 is provided with a polyvinyl alcohol coating 47 covered over the bulged portion 44a with a "Pliolite" coating 48. The exposed polyvinyl alcohol coatings at the ends of the cylinder 43 and on the cylindrical portions 44b of the closures can thus be sealed together, while the "Pliolite" coatings provide an inner moisture-impermeable envelope, these coatings preferably extending sufficiently toward the closure and cylinder edges to contact with one another when the container is assembled.

Fig. 9 illustrates the sealing of the top closure 41 to the container, after it is filled and while under vacuum. With the closure 41 loosely in place, the co-operating end of the cylinder 40 and cylindrical portion 44b of the closure are gripped under pressure between an inner sealing member 49 and an outer annular sealing member 50 carrying an electric heating element 51. When the proper sealing time has elapsed, the sealing elements are released and the sealed container removed from the vacuumizing chamber. The lower closure may be sealed to the container previously in the same manner, vacuum being unnecessary.

As shown in Fig. 6, the container immediately after vacuumizing has its closures in positions of inward deformation in contact with the granular material as explained above. When the material evolves gas, however, the closures may bulge outwardly and reach positions of maximum outward deformation, as shown in Fig. 7.

In practice, the two types of containers described above will ordinarily be labeled and, if desired, appropriately lacquered to prevent drying out of the polyvinyl alcohol coatings.

If desired, the containers described above may also include thin sheets of paper separating the granular material from any coatings which might otherwise contact therewith, as illustrated by Fig. 10 wherein a container of the type shown in Figs. 6 and 8 is provided with a paper sheet 52 covering each of the "Pliolite" coatings 48, and with a paper sheet 53 covering the "Pliolite" coating 46.

In both types of containers described above the deformable closures are shown bulged continuously over the entire extent of their deformable portions. However, this deformable portion may have any other suitable shape, such as a flat surface provided with a single annular bulge 54, as shown in Fig. 11, or a plurality of annular bulges 55, as shown in Fig. 12. The dotted lines in these figures indicate positions which these modified forms of closure may assume by their inward and outward deformation. While they are shown in a form adapting them to the type of container illustrated in Figs. 6 to 8, it is evident that they may also be applied to the type of container of Figs. 1 to 3.

It will be understood that the embodiments which have been illustrated and described are by way of example only. Inasmuch as other embodiments of the invention will readily suggest themselves to those skilled in the art, reference should be had to the appended claims for a definition of the limits of the invention.

What is claimed is:

1. A container of cardboard or like fibrous material adapted for vacuum packing comprising a cylindrical wall and end closures therefor, at least one of said end closures having a cylindrical portion extending within the end of said wall and a bulged end portion adapted to yield under pressure, the axial extent of said cylindrical portion being sufficient to prevent said end portion projecting beyond said wall when bulged outwardly, said wall and end closures having layers of air-impermeable material forming a continuous airtight envelope and layers of moisture-impermeable material forming a continuous moisture-proof envelope separating said air-impermeable material from the contents of the container, said moisture-impermeable layer of said one end closure extending at least far enough relative to the peripheral juncture of the end portion with the cylindrical portion to provide contact with said moisture-impermeable layer of the cylindrical wall and complete the moisture-proof envelope, said layers of air-impermeable material of said cylindrical wall and end closure being heat-sealed together beyond the region of said contact to complete said airtight envelope.

2. A container of cardboard or like fibrous material adapted for vacuum packing comprising a cylindrical wall and end closures therefor, at least one of said end closures having a cylindrical portion extending within the end of said wall and a bulged end portion adapted to yield under pressure, the axial extent of said cylindrical portion being sufficient to prevent said end portion projecting beyond said wall when bulged outwardly, said wall and end closures having layers of air-impermeable material forming a continuous airtight envelope and inner layers of moisture-impermeable material forming a continuous moisture-proof envelope separating said air-impermeable material from the contents of the container, said inner layer of said one end closure extending at least far enough around the peripheral juncture of the end portion with the cylindrical portion to provide contact with said inner layer of the cylindrical wall and complete the moisture-proof envelope, the ends of said cylindrical wall and cylindrical portion being flanged outwardly and crimped to form the edge of the container with said layers of air-impermeable material heat sealed together in the flanged area.

3. A container of cardboard or like fibrous material adapted for vacuum packing comprising a cylindrical wall having an outer layer of air-impermeable material and an inner layer of moisture-impermeable material separated and enclosed by layers of fibrous material, said air-impermeable layer and outer enclosing layer being extended and flanged outwardly at one end of the container, end closures for said cylindrical wall comprising outer and inner layers of air-impermeable and moisture-impermeable material united with the corresponding layers of the cylindrical wall to form continuous airtight and moisture-proof envelopes, the end closure at said one end of the container comprising a bulged end portion adapted to yield under pressure, a cylindrical portion extending within said cylindrical wall to prevent said end portion projecting beyond said wall when bulged outwardly, and a peripheral flange cooperating with the flange of said wall, said layer of air-impermeable material of the end closure extending over its flange and heat sealed to the air-impermeable material of the wall flange with said flanges crimped to form the edge of the container, said layer of moisture-impermeable material of the end closure extending over its cylindrical portion and at least far enough over its flange to meet the end of the layer of moisture-impermeable material in said wall.

4. A container of cardboard or like fibrous material adapted for vacuum packing comprising a cylindrical wall and end closures therefor, at least one of said end closures having a cylindrical portion extending within the end of said wall and a bulged end portion adapted to yield under pressure, the axial extent of said cylindrical portion being sufficient to prevent said end portion projecting beyond said wall when bulged outwardly, said wall and end closures having layers of air-impermeable material forming a continuous airtight envelope and layers of moisture-proof material forming a continuous moisture-proof envelope separating said air-impermeable material from the contents of the container, said moisture-impermeable and air-impermeable layers respectively forming inner and outer layers of said wall and said one end closure and extending different distances over the meeting cylindrical surfaces thereof with the air-impermeable layer extending beyond the moisture-impermeable layer, the juxtaposed air-impermeable layers and the juxtaposed moisture-impermeable layers being sealed together.

ARTHUR F. STAGMEIER.